(12) United States Patent
Shepler et al.

(10) Patent No.: US 9,923,906 B2
(45) Date of Patent: *Mar. 20, 2018

(54) SYSTEM, METHOD AND COMPUTER PROGRAM PRODUCT FOR ACCESS AUTHENTICATION

(71) Applicant: Webcetera, L.P., Lewisville, TX (US)

(72) Inventors: Brian E. Shepler, Flower Mound, TX (US); Charles J. Holloway, Flower Mound, TX (US); Nagaraj V. Rao, Flower Mound, TX (US)

(73) Assignee: Webcetera, L.P., Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,062

(22) Filed: Jan. 8, 2017

(65) Prior Publication Data

US 2017/0118227 A1    Apr. 27, 2017

Related U.S. Application Data

(63) Continuation of application No. 13/052,701, filed on Mar. 21, 2011, now Pat. No. 9,542,545.

(51) Int. Cl.
*H04L 29/06* (2006.01)
*H04L 12/58* (2006.01)

(52) U.S. Cl.
CPC ............ *H04L 63/126* (2013.01); *H04L 51/10* (2013.01); *H04L 63/102* (2013.01); *H04L 63/18* (2013.01); *G06F 2221/2151* (2013.01)

(58) Field of Classification Search
CPC ...... H04L 63/126; H04L 51/10; H04L 63/102; H04L 63/18
See application file for complete search history.

(56) References Cited

U.S. PATENT DOCUMENTS

| | | |
|---|---|---|
| 6,182,227 B1 | 1/2001 | Blair et al. |
| 6,314,425 B1 | 11/2001 | Serbinis et al. |
| 6,360,254 B1 | 3/2002 | Linden et al. |
| 6,564,257 B1 | 5/2003 | Emens et al. |
| 6,718,328 B1 | 4/2004 | Norris |
| 7,257,834 B1 | 8/2007 | Boydstun et al. |
| 7,353,282 B2 | 4/2008 | Nichols et al. |

(Continued)

OTHER PUBLICATIONS

Huizendveld et al. (What is safer? Should I send an email with a URL that expires to users to reset their password or should I email a newly generated password?, Stack Overflow, Feb. 2010, 7 pages).*

(Continued)

*Primary Examiner* — Oleg Korsak
(74) *Attorney, Agent, or Firm* — James L. Baudino

(57) ABSTRACT

A method and technique for access authentication includes: responsive to receiving an access request from a user for a secure resource, transmitting a uniform resource locator (URL) to the user; responsive to transmitting the URL to the user, logging a timestamp for the URL transmission; responsive to receiving a request for the URL, logging a timestamp for the URL request; and responsive to verifying that a difference between the timestamp for the URL transmission and the timestamp for the URL request is within a predetermined time period, providing access to the secure resource.

12 Claims, 3 Drawing Sheets

(56) References Cited

U.S. PATENT DOCUMENTS

| | | |
|---|---|---|
| 7,467,401 B2 * | 12/2008 | Cicchitto .............. G06F 21/305 |
| | | 713/182 |
| 7,581,244 B2 | 8/2009 | Li et al. |
| 7,606,918 B2 | 10/2009 | Holzman et al. |
| 2002/0120757 A1 | 8/2002 | Sutherland et al. |
| 2007/0157291 A1 | 7/2007 | Chua |
| 2008/0134343 A1 | 6/2008 | Pennington et al. |
| 2009/0070858 A1 | 3/2009 | Hiraide et al. |
| 2009/0133107 A1 | 5/2009 | Thoursie |
| 2009/0158412 A1 | 6/2009 | Miller et al. |
| 2009/0235346 A1 | 9/2009 | Steinberg |
| 2010/0131409 A1 | 5/2010 | Lawyer et al. |

OTHER PUBLICATIONS

Unidata (Forget Your Email Address? Aug. 30, 2006, 1 page, retrieved from WebArchive).*
McLaughlin; Database-Based Authentication for PHP Apps, Part 1; May 2001; pp. 1-10.
Zendesk Remote Authentication; Oct. 11, 2008.

* cited by examiner

SYSTEM, METHOD AND COMPUTER PROGRAM PRODUCT FOR ACCESS AUTHENTICATION

BACKGROUND

Many websites available via the Internet or other network connections enable users to access secure or private resources. The resources may contain account information, e-commerce information, or a variety of types of personal information. In order to access the secure resource, the user must generally enter some type of authentication information, such as a username and password. However, with the number of different websites and/or resources a user may be registered with, it can be burdensome for a user to remember the authorization information needed for each resource.

BRIEF SUMMARY

According to one aspect of the present disclosure a method and technique for access authentication is disclosed. The method includes: responsive to receiving an access request from a user for a secure resource, transmitting a uniform resource locator (URL) to the user; responsive to transmitting the URL to the user, logging a timestamp for the URL transmission; responsive to receiving a request for the URL, logging a timestamp for the URL request; and responsive to verifying that a difference between the timestamp for the URL transmission and the timestamp for the URL request is within a predetermined time period, providing access to the secure resource.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
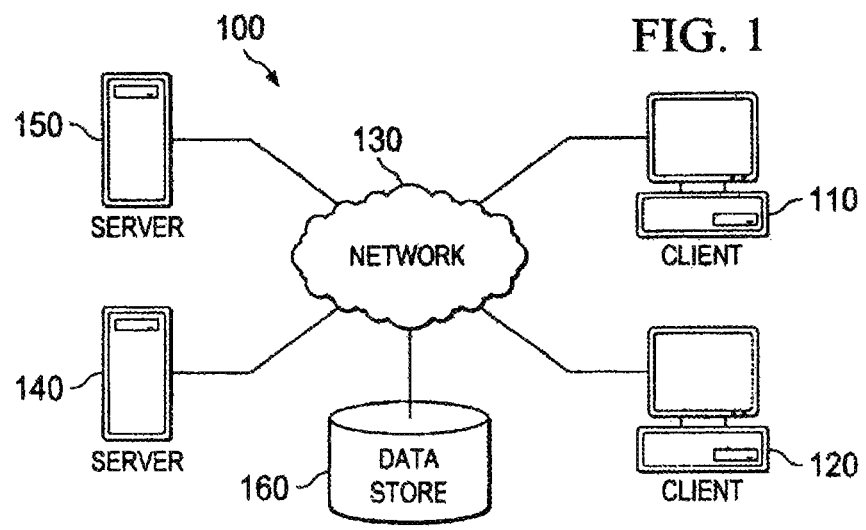
FIG. 1 is an embodiment of a network of data processing systems in which the illustrative embodiments of the present disclosure may be implemented.

Embodiments of the present disclosure provide a method, system and computer program product for access authentication. For example, in some embodiments, the method and technique includes: responsive to receiving an access request from a user for a secure resource, logging an Internet Protocol (IP) address of the access request; transmitting a uniform resource locator (URL) to the user via an electronic mail message; responsive to receiving a request for the URL, logging an IP address corresponding to the URL request; and responsive to validating the IP address corresponding to the URL request with the IP address of the access request, providing access to the secure resource. Thus, embodiments of the present disclosure enable access authentication without requiring the user to remember a password or other difficult-to-remember information. Further, embodiments of the present disclosure use a variety of different authentication processes and/or elements to authenticate the identity of the user requesting access and to ensure that access information has not been maliciously intercepted and/or otherwise compromised.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure as described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
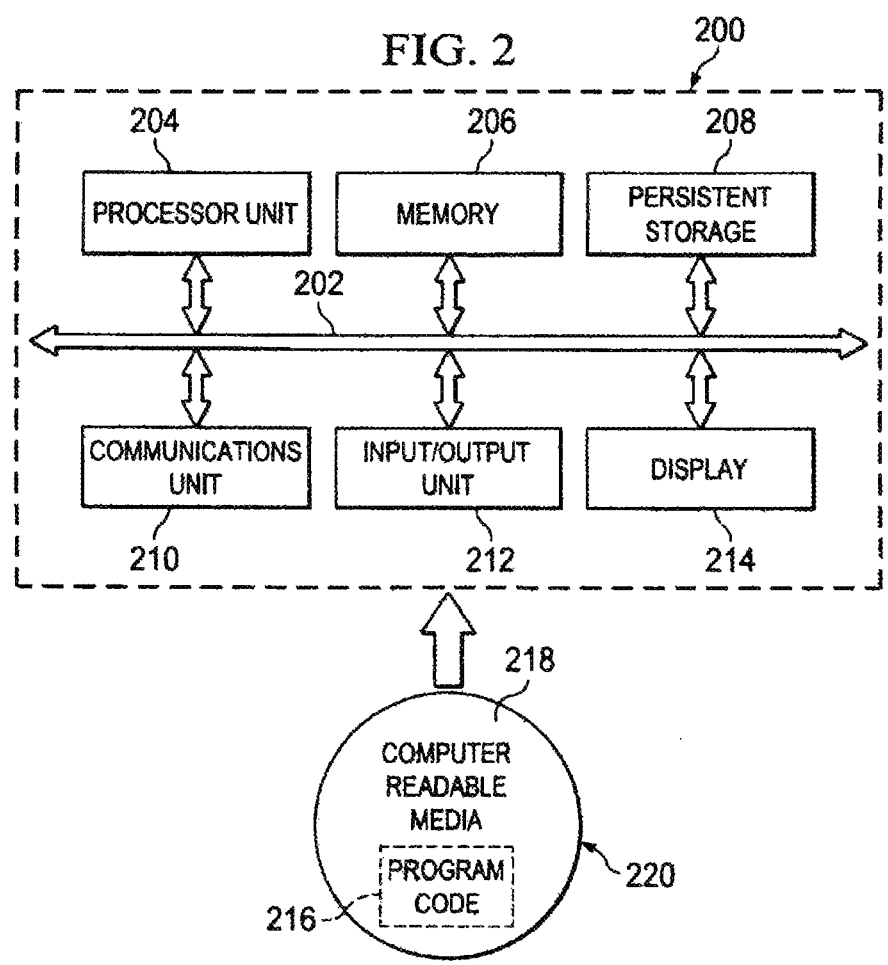
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways to communicate with one another. Network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of an access authentication system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
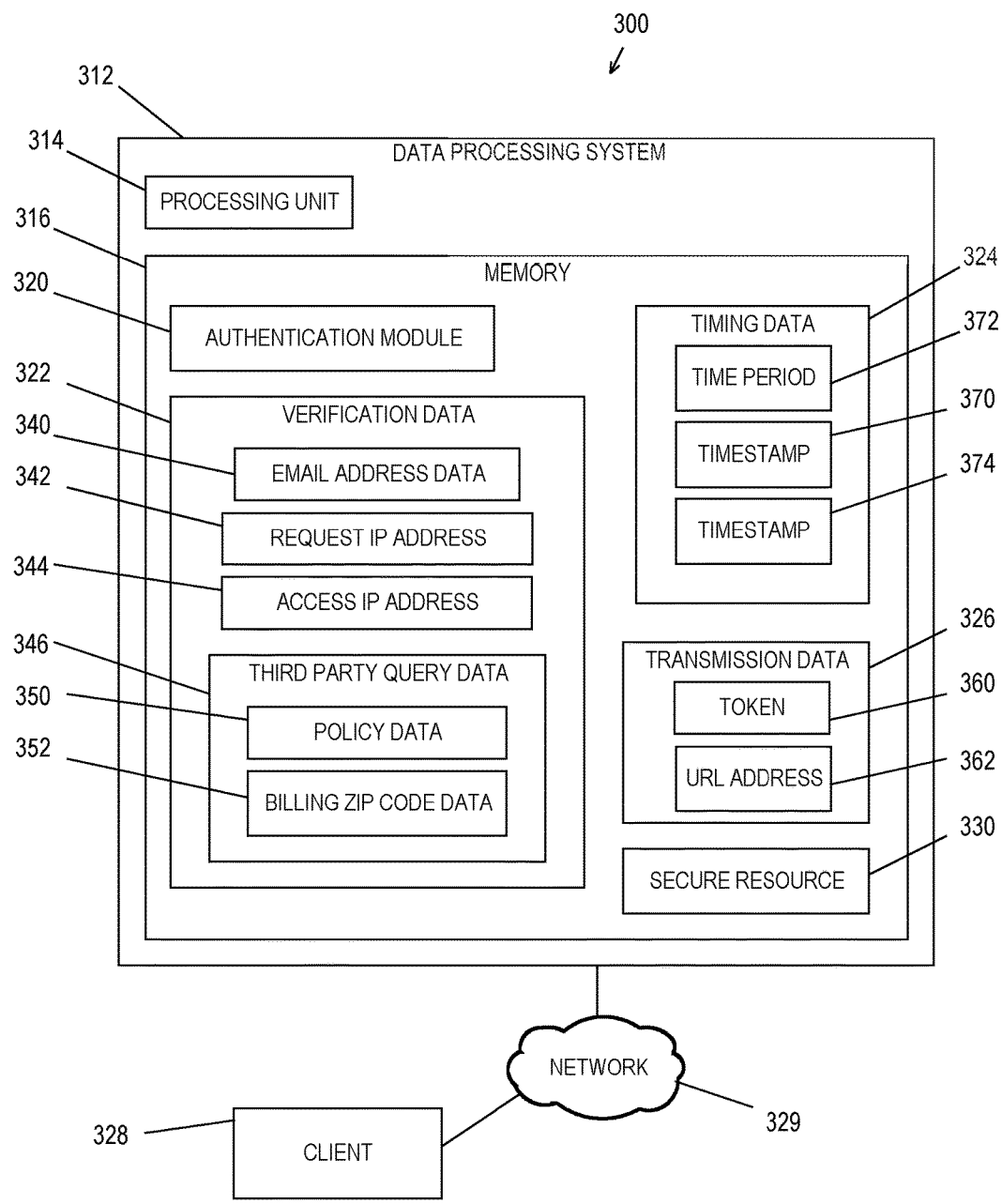
FIG. 3 is a diagram illustrating an embodiment of a data processing system in which illustrative embodiments of an access authentication system may be implemented.

FIG. 3 is an illustrative embodiment of a system 300 for access authentication. System 300 may be implemented on data processing systems or platforms such as, but not limited to, servers 140 and/or 150, clients 110 and/or 120, or at other data processing system locations. In the embodiment illustrated in FIG. 3, system 300 comprises a data processing system 312 having a processing unit 314 and a storage resource or memory 316. In the embodiment illustrated in FIG. 3, memory 316 comprises an authentication module 320, verification data 322, timing data 324 and transmission data 326. In FIG. 3, authentication module 320 is illustrated as a software program residing in memory 316 and executable by processing unit 314. However, it should be understood that authentication module 320 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Authentication module 320 performs various operations to authenticate the identity of a user attempting to access a secure resource 330, such as a secure account database or other private information. The secure resource 330 may reside on data processing system 312 or may be located elsewhere such that the resource is accessible by system 312 and/or authentication information may be passed to another data processing system controlling access to the resource. As will be described further below, module 320 may utilize timing data 324, verification data 322 and/or transmission data 326 to verify the identity of a user attempting to access resource 330. The user generally uses a client 328 (such as clients 110 and/or 120) to access data processing system 312 over a communications network 329, such as the Internet using a web browser.

In the embodiment illustrated in FIG. 3, verification data 322 includes electronic mail (email) address data 340, request Internet Protocol (IP) address data 342, access IP address data 344 and third party query data 346. Email address data 340 includes information regarding a stored email address for the user acquired during, for example, an initial registration process, other prior contact, or entered by a system administrator. In some embodiments, during an initial login request to gain access to resource 330, module 320 requests an email address from the user and compares and/or otherwise validates the input email address to email address data 340 stored for the user.

In some embodiments, module 320 records and/or otherwise logs an IP address corresponding to an initial login request by the user to gain access to the secure resource 330 and an IP address of a subsequent access session initiated by the user to continue the process of accessing the secure resource 330. As will be described further below, in some embodiments, module 320 compares the two IP address to verify the IP addresses match. In this embodiment, two different access sessions are used to gain access to resource 330 and the IP addresses corresponding to each of the two sessions is recorded and compared to verify that access is being made from the same IP address.

Third party query data 346 includes information associated with the user requesting access to resource 330 that was obtained from a source other than the user. For purposes of illustration, in FIG. 3, data 346 includes policy data 350 and billing zip code data 352. In this example, the resource 330 may be an account database held and/or controlled by an insurance broker. Third part query data 346 may represent data obtained by the broker from an insurance carrier such as a policy number or type of insurance policy held by the user, which may be represented as policy data 350 in FIG. 3, and a property or billing zip code for the user, which may be represented as billing zip code data 352 in FIG. 3. In operation, module 320 formulates a query to submit to the user during an access request based on one or more verification data 322 criteria. A response submitted by the user is compared to the stored third party query data 346 for validation.

Transmission data 326 includes information that is communicated to the user for further authentication of the identity of the user. For example, in some embodiments, transmission data 326 includes a token 360 and a Uniform Resource Locator (URL) address 362. In this embodiment, in response to an initial login request from the user, module 320 generates token 360 and combines token 360 with a character string to form a unique URL 362. In some embodiments, token 360 is randomly generated. Module 320 then communicates URL 362 to the user via an electronic mail message using the email address of the user stored as email address 340. The user, in order to continue the access procedure, must click on the URL 362 contained in the email message or otherwise load the URL 362 into a browser. Upon receiving a request to access URL 362, module 320 validates the IP addresses as discussed above. For example, in some embodiments, during the initial login request where URL 362 is formed, module 320 records the IP address of the user request and stores the IP address as request IP address 342. During the subsequent access process where the user attempts to access the URL 362, module 320 again records the IP address of the user request and stores the IP address as access IP address 344. Module 320 verifies that IP address 342 matches IP address 344, thereby ensuring that some third party has not maliciously obtained the URL 362 or that the URL 362 was not inadvertently received by some third party.

In some embodiments, module 320 utilizes timing data 324 to limit the availability of a particular URL 362. For example, in some embodiments, module 320 records and/or otherwise logs a timestamp 370 upon the transmission of URL 362 to the user. Timing data 324 includes information limiting the availability of the URL 362. For example, timing data 324 may be set for a time period 372 of three minutes or some other desired time period. In response to receiving a request to access URL 362, module 320 records and/or otherwise logs another timestamp 374 and verifies that the difference between timestamps 370 and 374 falls within the period defined by time period 372.

Figure 4:
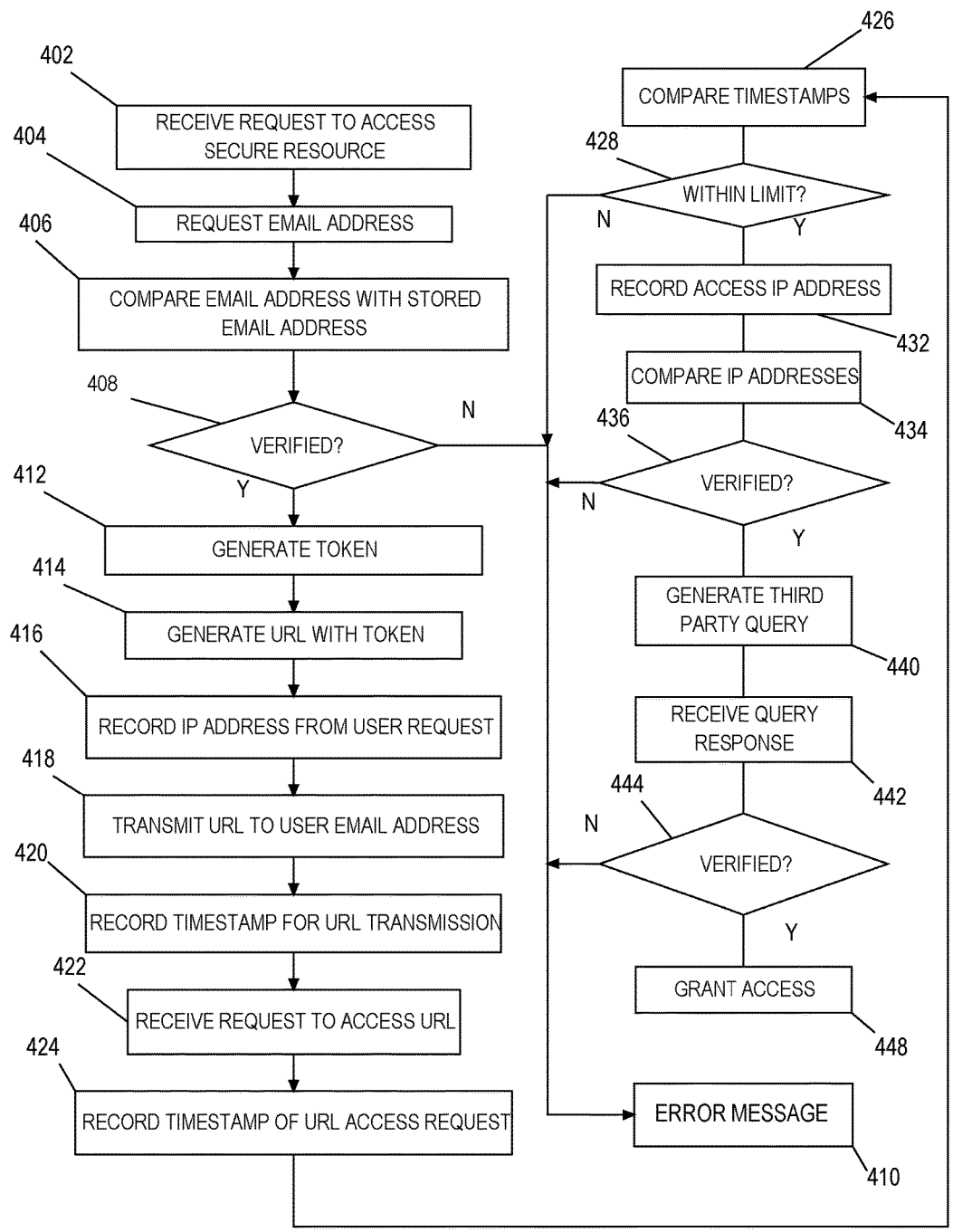
FIG. 4 is a flow diagram illustrating an embodiment of an access authentication method.

FIG. 4 is a flow diagram illustrating an embodiment of a method for access authentication. The method begins at block 402, where system 300 receives an initial login request to access resource 330. At block 404, module 320 requests an email address from the user. At block 406, module 320 compares the email address received from the user with email address data 340 corresponding to the user. At decisional block 408, module 320 verifies that the provided email address corresponds to the email address stored for the user. If not, the method proceeds to block 410, where an error message is returned. If so, the method proceeds to block 412.

At block 412, module 320 generates token 360. At block 414, module 320 generates URL 362 by combining token 360 with a character string. At block 416, module 320 records an IP address corresponding to the user request and stores the IP address as request IP address 342. At block 418, module 320 transmits URL 362 via an electronic mail message to the email address indicated by email address data 340. At block 420, module 320 records timestamp 370.

At block 422, system 300 receives a request to access URL 362. At block 424, module records timestamp 374. At block 426, module 320 compares timestamps 370 and 374. At decisional block 428, module 320 determines whether the difference between timestamps 370 and 374 falls within a time period as defined by time period 372. If not, the method proceeds to block 410, where an error message is returned. If so, the method proceeds to block 432.

At block 432, module 320 records the IP address for the session requesting access to URL 362 and stores the IP address as access IP address 344. At block 434, module 320 compares IP addresses 342 and 344. At decisional block 436, a determination is made by module 320 whether IP address 344 matches IP address 342. If not, the method proceeds to block 410, where an error message is returned. If so, the method proceeds to block 440.

At block 440, module 320 accesses third party query data 346, generates a query based on third party query data 346, and submits the query to the user. At block 442, module 320 receives a response to the query from the user. At decisional block 444, module 320 determines whether the response to the query is verified based on third party query data 346. If not, the method proceeds to block 410, where an error message is returned. If so, the method proceeds to block 448, where access is granted to resource 330.

Thus, embodiments of the present disclosure enable access authentication without requiring the user to remember a password or other difficult-to-remember information. Further, embodiments of the present disclosure use a variety of different authentication processes and/or elements to authenticate the identity of the user requesting access and to ensure that access information has not been maliciously intercepted and/or otherwise compromised.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
responsive to receiving an access request from a user for a secure resource, transmitting a uniform resource locator (URL) to the user;
responsive to transmitting the URL to the user, logging a timestamp for the URL transmission;
responsive to receiving a request for the URL, logging a timestamp for the URL request; and
responsive to verifying that a difference between the timestamp for the URL transmission and the timestamp for the URL request is within a predetermined time period, providing access to the secure resource.

2. The method of claim 1, further comprising transmitting the URL to the user via an electronic mail message.

3. The method of claim 1, further comprising:
responsive to receiving the access request, querying the user for an electronic mail address; and
responsive to receiving an electronic mail address from the user, verifying the electronic mail address received from the user with a stored electronic mail address corresponding to the user.

4. The method of claim 1, further comprising:
generating a token; and
combining the token with a character string to form the URL.

5. The method of claim 4, wherein generating the token comprises randomly generating the token.

6. The method of claim 1, further comprising:
generating a query based on data received from a third party corresponding to the user;
transmitting the query to the user;
receiving a response to the query from the user; and
responsive to validating the response to the query received from the user, providing access to the secure resource.

7. A system comprising:
a processing unit having access to a secure resource; and
an authentication module executable by the processing unit to:
responsive to receiving an access request from a user for a secure resource, transmit a uniform resource locator (URL) to the user;
responsive to transmitting the URL to the user, log a timestamp for the URL transmission;
responsive to receiving a request for the URL, log a timestamp for the URL request; and
responsive to verifying that a difference between the timestamp for the URL transmission and the timestamp for the URL request is within a predetermined time period, provide access to the secure resource.

8. The system of claim 7, wherein the authentication module is executable to transmit the URL to the user via an electronic mail message.

9. The system of claim 7, wherein the authentication module is executable to:
responsive to receiving the access request, query the user for an electronic mail address; and
responsive to receiving an electronic mail address from the user, verify the electronic mail address received from the user with a stored electronic mail address corresponding to the user.

10. The system of claim 7, wherein the authentication module is executable to:
generate a token; and
combine the token with a character string to form the URL.

11. The system of claim 10, wherein the authentication module is executable to randomly generate the token.

12. The system of claim 7, wherein the authentication module is executable to:
generate a query based on data received from a third party corresponding to the user;
transmit the query to the user;
receive a response to the query from the user; and
responsive to validating the response to the query received from the user, provide access to the secure resource.

* * * * *